United States Patent
Zolnierz et al.

(10) Patent No.: US 7,017,518 B2
(45) Date of Patent: Mar. 28, 2006

(54) DEVICE AND METHOD FOR REDUCING SPILLAGE IN AND AROUND A DOG BOWL

(76) Inventors: Gary Zolnierz, 112 Peggy La., Chalfont, PA (US) 18914; Susan Zolnierz, 112 Peggy La., Chalfont, PA (US) 18914

( * ) Notice: Subject to any disclaimer, the term of this patent is extended or adjusted under 35 U.S.C. 154(b) by 205 days.

(21) Appl. No.: 10/094,441

(22) Filed: Mar. 11, 2002

(65) Prior Publication Data

US 2003/0168016 A1    Sep. 11, 2003

(51) Int. Cl.
*A01K 7/00*    (2006.01)

(52) U.S. Cl. ....................................................... 119/61
(58) Field of Classification Search ............... 119/165, 119/61, 72, 51.5, 162, 166, 167, 168, 61.5, 119/61.51–61.55; 730/121, 129, 130, 132, 730/133
See application file for complete search history.

(56) References Cited

U.S. PATENT DOCUMENTS

| | | | |
|---|---|---|---|
| 2,741,223 A * | 4/1956 | Winborn, Jr. | 119/165 |
| 3,076,435 A * | 2/1963 | Seymour | 119/77 |
| 3,441,003 A * | 4/1969 | DuMond et al. | 119/61 |
| 3,990,397 A * | 11/1976 | Lowe, Jr. | 119/165 |
| 4,436,056 A * | 3/1984 | MacLeod | 119/72 |
| 4,436,506 A * | 3/1984 | Berkhof | 431/76 |
| 4,766,845 A * | 8/1988 | Bavas | 119/165 |
| 4,784,086 A * | 11/1988 | Hand et al. | 119/61 |
| 4,840,143 A * | 6/1989 | Simon | 119/52.1 |
| 4,905,629 A * | 3/1990 | Hand et al. | 119/61.53 |
| 5,165,365 A * | 11/1992 | Thompson | 119/61 |
| 5,205,242 A * | 4/1993 | Kasselman | 119/61 |
| 5,277,149 A * | 1/1994 | East | 119/51.5 |
| 5,297,504 A * | 3/1994 | Carrico | 119/61 |
| 5,421,289 A * | 6/1995 | Capellaro | 119/475 |
| 5,577,461 A * | 11/1996 | Sebastian et al. | 119/51.5 |
| 6,142,101 A * | 11/2000 | Pelsor | 119/61 |
| 6,167,840 B1 * | 1/2001 | White et al. | 119/61 |

* cited by examiner

*Primary Examiner*—Thomas Price
(74) *Attorney, Agent, or Firm*—Lamorte & Associates

(57) ABSTRACT

A device and method for creating an improved feeding bowl assembly by attaching a guard device to a pet feeding bowl. The guard device is a bowl shaped guard that is positioned on top of a traditional pet feeding bowl. The guard device prevents food or water from being splashed out of the feeding bowl by the pet. Furthermore, the guard has a diameter that is larger than that of the feeding bowl. As such, the guard device catches drippings from the animal that would not otherwise be caught by the feeding bowl.

6 Claims, 3 Drawing Sheets

DEVICE AND METHOD FOR REDUCING SPILLAGE IN AND AROUND A DOG BOWL

BACKGROUND OF THE INVENTION

1. Field of the Invention

In general, the present invention relates to dog bowls and other such animal feeding bowls. More particularly, the present invention relates to the structure of dog bowls and the structure of attachments for use with dog bowls that help reduce the amount of food or water an animal splashes out of the bowl when feeding.

2. Prior Art Statement

The prior art is replete with different types of bowls and other containers that can be used to feed a pet dog or another animal that eats at floor level. As most any dog owner would testify, dogs do not exhibit many manners when they eat. Often when a dog eats food from a bowl placed on the floor, the dog's snout displaces food from the bowl and the food falls on the floor. When a dog drinks water from a bowl, the dog's snout is submersed in the water and becomes wet. When the dog lifts its head out of the bowl, the water from the wet snout drips onto the floor. Furthermore, when a dog is either drinking or eating from a bowl, it is not uncommon for the dog to move the bowl along the floor with its snout and tip the bowl, thereby spilling the contents of the bowl onto the floor.

The prior art is replete with different types of specialized bowls and containers that are designed to reduce the amount of spillage that occurs from a dog bowl. One common type of prior art bowl is the weighted feeding bowl. Weighted feeding bowls are bowls that have enlarged, heavy bases. By increasing the size and weight of the base of the bowl, the center of gravity for the bowl is lowered. Therefore, it becomes harder for a dog to accidentally tip the bowl. Such prior art dog bowls are exemplified by U.S. Pat. No. 5,979,361 to Willinger, entitled Non-Skid Pet Bowl.

Although bowls with weighted bases are harder to tip, they do not prevent a dog from displacing food or water out of the bowl with the dog's snout. To prevent dogs from displacing food out of a bowl or splashing water out of a bowl, bowls have been designed with covers that expose only a small portion of the contents of the bowl to the feeding animal. By exposing only a small portion of the food or water in a bowl, the feeding dog does not displace the food with its snout or submerse its snout in the exposed volume of water. Prior art bowls with lids that expose only a portion of the bowl are exemplified by U.S. Pat. No. 3,810,446 to Kightlinger, entitled Animal Food Bowl And Cover Therefore; and U.S. Pat. No. 4,436,056 to MacLeod, entitled Spill-Resistant Pet Animal Dish.

A problem associated with such limited access bowls is that the feeding animal is not exposed to the full contents of the bowl at once. Consequently, the feeding animal may press its snout as far as possible into the bowl trying to reach food that is stuck in the protected areas of the bowl. This causes the feeding animal to press hard against the bowl, thereby greatly increasing the chances that the bowl will be moved and tipped over by the animal. Another disadvantage of limited access bowls is that food tends to get stuck in the inaccessible regions of the bowl. This food may rot, thereby making the bowl unsanitary to use, even by a dog.

A need therefore exists in the art for a new device that will prevent a pet from spilling food or water out of a bowl without either weighting the bowl or restricting access to the contents of the bowl. This need is met by the present invention as described and claimed below.

SUMMARY OF THE INVENTION

The present invention is a device and method for creating an improved feeding bowl assembly by attaching a guard device to a pet feeding bowl. The guard device is a bowl shaped guard that is positioned on top of a traditional pet feeding bowl. The guard device prevents food or water from being splashed out of the feeding bowl by the pet. Furthermore, the guard has a diameter that is larger than that of the feeding bowl. As such, the guard device catches drippings from the animal that would not otherwise be caught by the feeding bowl.

The guard device is either suspended over the pet feeding bowl or attached directly to the pet feeding bowl. When suspended over the feeding bowl, the guard device contains support elements that hold the guard device above the feeding bowl. When attached to the feeding bowl, the guard device contains a cylindrical section that passes into the feeding bowl and engages the feeding bowl with either an interference fit or a snap-together fit.

BRIEF DESCRIPTION OF THE DRAWINGS

For a better understanding of the present invention, reference is made to the following descriptions of exemplary embodiments thereof, considered in conjunction with the accompanying drawings, in which.

DETAILED DESCRIPTION OF THE INVENTION

Although the present invention guard device can be applied to many different types of feeding bowls and containers, the present invention guard device is especially well suited for use with a simple round dog feeding bowl. Accordingly, in the exemplary embodiments of the invention that are shown, the present invention guard device is shown with a traditional round dog bowl.

Figure 1:
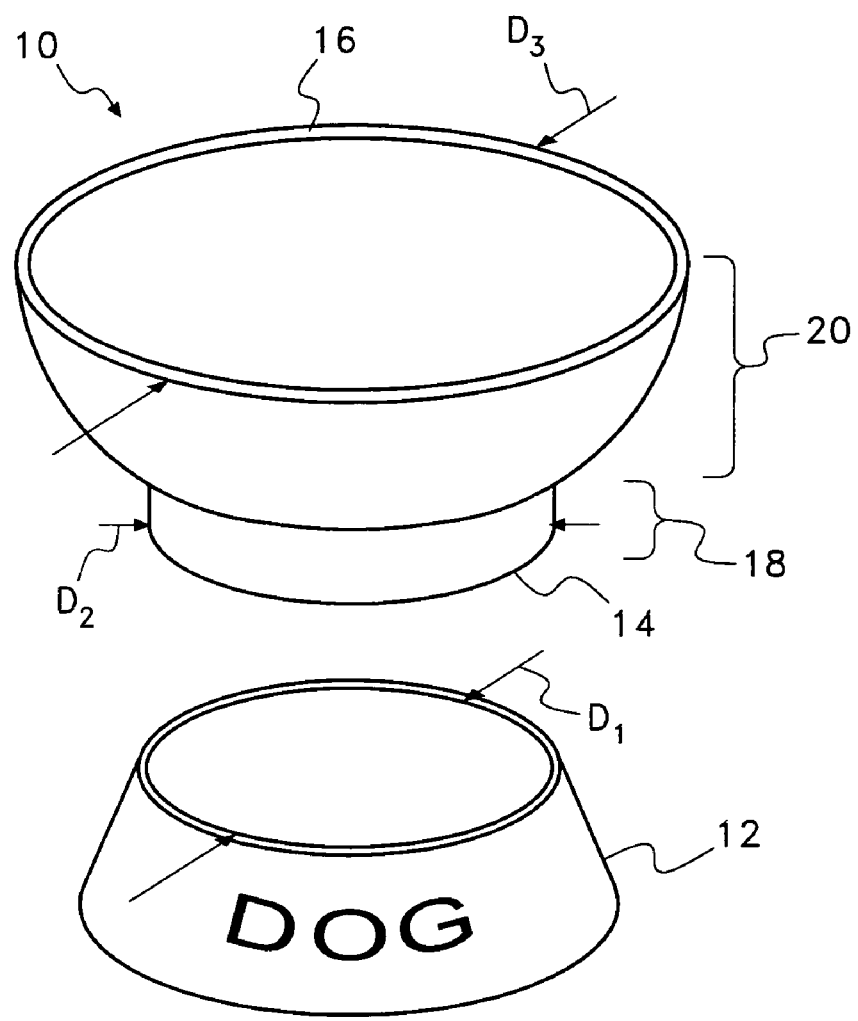
FIG. 1 is a perspective view of an exemplary embodiment of the present invention guard device shown in conjunction with a dog bowl.

Referring to FIG. 1, an exemplary embodiment of the present invention guard device 10 is shown with a conventional round dog feeding bowl 12. The dog feeding bowl 12 is a bowl that has a circular open top of a first internal diameter D1. The top internal diameter D1 of the dog feeding bowl 12 is typically between six inches and ten inches, if used to feed or water an average dog. Smaller diameter bowls are for smaller dogs and other smaller pets, such as cats. Many people utilize heavy ceramic or metal bowls to feed or water their pets. Still other people use old kitchen bowls. Any such bowl can be used in conjunction with the present invention guard device 10.

When a person feeds or give water to their pet, they typically fill the feeding bowl at least half full with food or water. Any food or water that is displaced from the feeding bowl by the pet spills over the edge of the bowl and falls to the floor. This dirties the floor, thereby requiring that the floor around the dog bowl be cleaned often. Furthermore, food or water often adheres to the hair of the pet on its snout. When the pet pauses from feeding or drinking and lifts its head from the feeding bowl, it is not uncommon for food or water to drip from the pet's snout and fall to the floor. This is particularly prevalent with larger dogs that have large jowls. These spots of food and water not only dirty or wet the floor, they present potential slipping hazards if inadvertently stepped upon.

The present invention guard device 10 is a guard that attaches to the top of the dog bowl 12 and dramatically increases the area of that bowl. This increase in area prevents a dog from displacing food or water from the dog bowl 12 and catches drippings that may fall from the pet's snout or jowls.

The guard device 10 is an annular structure having a circular bottom edge 14 of a first diameter D2 and a circular top edge 16 of a larger second diameter D3. The guard device 10 is formed into two separate sections between the bottom edge 14 and the top edge 16. The two sections include a bowl engagement section 18 and an expanding section 20. The bowl engagement section 18 is a cylindrically shaped section. The exterior of the bowl engagement section 18 has the same external diameter D2 as does the bottom edge 14 of the guard device 10. This diameter D2 is preferably selected to be only slightly smaller than the inside diameter D1 of the dog bowl 12. The bowl engagement section 18 has a vertical length of between ¼ inch and three inches. Accordingly, when the guard device 10 is placed onto the dog bowl 12, the bowl engagement section 18 passes into the dog bowl until either the bottom edge 14 of the guard device 10 contacts the bottom of the dog bowl 12 or the top edge of the dog bowl 12 contacts the expanding section 20 of the guard device 10.

Preferably, the vertical length of the engagement section of the guard device equals the depth of the dog bowl 12. Likewise, the diameter D2 of the exterior of the engagement section 18 of the guard device 10 matches the interior diameter of the dog bowl 12. Although a mismatched guard device 10 and bowl 12 can be used, match sets are preferable. For this reason a guard device 10 can be sold in sets with a matching dog bowl 12. If the dimensions of the engagement section 18 of the guard device 10 closely match the dimensions on the interior of the dog bowl 12, the guard device 10 firmly engages the dog bowl 12 and is not easily knocked away from the dog bowl 12. The closeness in dimensions creates a friction fit that serves to retain the guard device 10 in attachment with the dog bowl 12.

If matched sets are used, the dog bowl can be created with a rim of a certain standard thickness. The guard device 10 can be manufactured with a groove that accepts the rim of the dog bowl, thereby interconnecting the dog bowl and the guard device with a mechanical attachment.

Once the guard device 10 is attached to the dog bowl 12, the top edge 16 of the guard device 10 becomes the new open top to the combined bowl/guard assembly. This increases the area of the opening of the dog bowl 12 from between 25% to 300%. As an animal eats or drinks from the combined bowl/guard assembly, the presence of the guard device 10 prevents the dog from displacing food or water from the dog bowl 12 with its snout. Furthermore, as the dog pauses from eating or drinking and lifts its head from the bowl, drippings from the dog's snout and jowls will fall onto the guard device 10 and will flow back into the dog bowl 12. As such, the guard device 10 greatly decreases the amount of food and water spillage that contacts the floor without restricting access of the dog bowl 12 to the dog.

Figure 2:
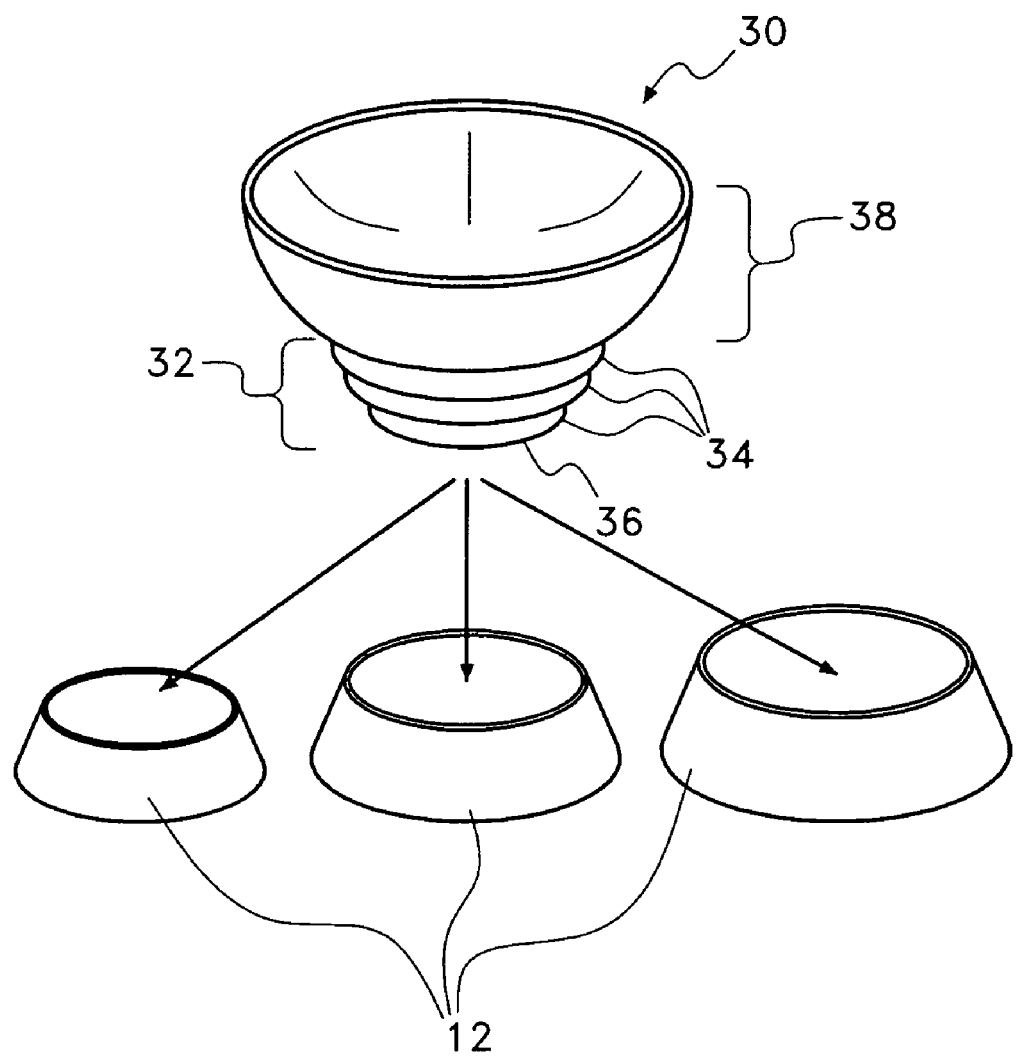
FIG. 2 is a perspective view of an alternate embodiment of a guard device shown in conjunction with a plurality of dog bowls.

Referring to FIG. 2, an alternate embodiment of the present invention guard device 30 is shown. In this embodiment, the engagement section 32 of the guard device 30 is stepped in its configuration. The stepped configuration consists of a plurality of cylindrical sections 34, wherein each successive cylindrical section 34 increases in diameter as they progress from the bottom edge 36 of the engagement section 32 toward the expanding section 38. By providing a stepped engagement section 32, the engagement section 32 is capable of engaging a plurality of different diameter bowls 12 with a friction fit. Consequently, the guard device 30 can engage a plurality of different diameter bowls 12 provided one of the cylindrical sections 34 on the stepped configuration has a diameter that corresponds to the diameter of one of the bowls 12.

Figure 3:
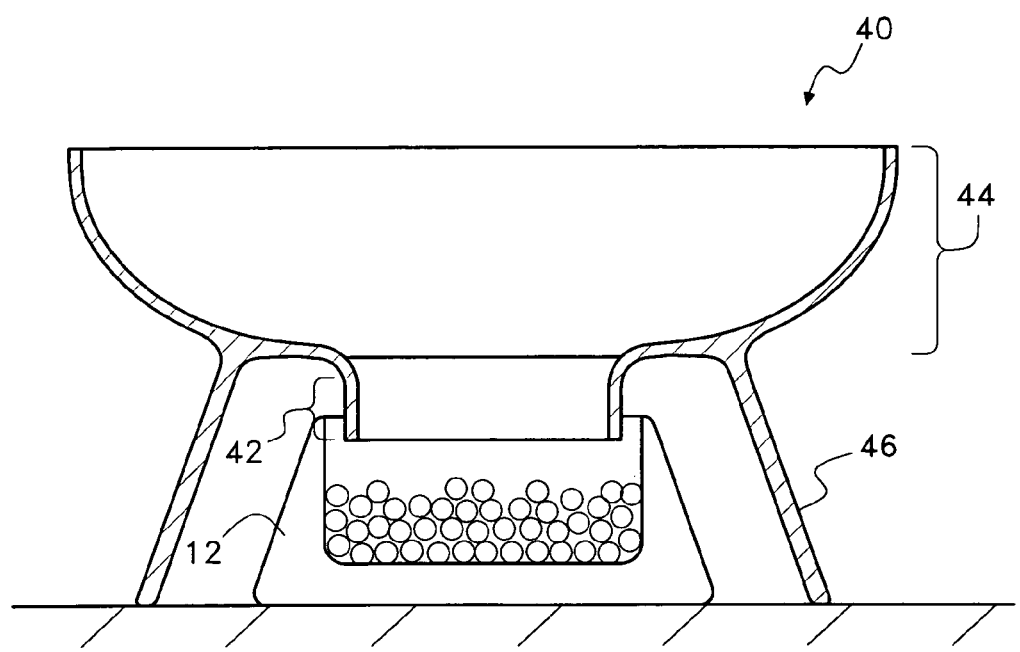
FIG. 3 is a cross-sectional view of an alternate embodiment of a guard device positioned above a dog bowl.

Referring to FIG. 3, yet another embodiment of the present invention guard device 40 is provided. In this embodiment, it can be seen that the guard device 40 has a cylindrical engagement section 42 and a curved expanding section 44, as does the embodiment previously shown in FIG. 1. However, in this embodiment, at least one support structure 46 extends downwardly from the bottom of the curved expanding section 44 and supports the guard device 40 on the ground. The support structure 46 can be one continuous wall that surrounds the engagement section 44 or can be a plurality or legs that are symmetrically disposed around the engagement section 42.

The support structure 46 supports the remainder of the guard device 40 a predetermined distance above the ground. A dog bowl 12 can be placed under the guard device 40 within the space defined by the support structure 46. As such, the support structure 46 supports the remainder of the guard device 40 over the dog bowl 12. This enables the guard device 40 to be used with a dog bowl 12, even though the diameter of the dog bowl 12 is much larger than that of the bottom edge of the guard device 40.

It will be understood that the embodiments of the present invention device described and illustrated are merely exemplary and a person skilled in the art can make many variations to the shown embodiment. For example, in the embodiment of FIG. 3, it will be understood that the support structure 46 can be made as a structure that is part of the overall guard device, as shown, or it can be made as a separate detachable element. In all embodiments, the diameters, depth and slope of the expanding region of the guard device can be altered as desired. Lastly, the diameters and number of cylindrical sections 34 used in the embodiment of FIG. 2 can also be altered as desired. All such alternate embodiments and modifications are intended to be included within the scope of the present invention as defined below in the claims.

What is claimed is:

1. An assembly, comprising:
   a bowl having a base and an open bowl top of a first diameter;
   a guard having
     an open bottom;
     an open guard top having a second diameter larger than said first diameter of said open bowl top;
     at least one cylindrical section proximate said open bottom, and;
     an expanding section, disposed between said open guard top and said at least one cylindrical section, that extends both radially and upwardly from said at least one cylindrical section; and
   wherein said at least one cylindrical section is received within said open bowl top and engage said bowl with a friction fit, therein supporting said expanding section of said guard and said open guard top outside of said bowl and above said open bowl top of said bowl;
   said guard contains a plurality of cylindrical sections of different diameters positioned one atop another to form a stepped structure that leads to said open bottom of said guard, and said expanding section extends both radially and upwardly from the stepped structure.

2. The assembly according to claim 1, wherein said guard is selectively attachable to and detachable from said bowl.

3. The assembly according to claim 1, wherein said open guard top is at least 50% larger than said open bowl top.

4. The assembly according to claim 1, wherein said expanding section has an interior surface with a concave curvature.

5. A method of attaching a spill guard to a pet feeding bowl, comprising the steps of:

providing a spill guard having at least one cylindrical section that leads to an open bottom, and an expanding section that leads to an open top, wherein said expanding section both radially and upwardly extends from said at least one cylindrical section;

providing a pet feeding bowl having an opening with an interior diameter that matches an exterior diameter of at least one cylindrical section;

inserting said at least one cylindrical section into said feeding bowl with a friction fit, wherein said open bottom of said guard leads into said feeding bowl and said expanding section said guard is supported outside and above said feeding bowl, said step of providing a spill guard includes providing a spill guard having a plurality of cylindrical sections of different diameters positioned one atop another to form a stepped structure, wherein said expanding section extends both radially and upwardly from said stepped structure.

6. The method according to claim 5, wherein said step of inserting said at least one cylindrical section into said feeding bowl includes advancing said stepped structure into said feeding bowl with a friction fit.

* * * * *